United States Patent
Götting et al.

(10) Patent No.: US 6,625,224 B1
(45) Date of Patent: Sep. 23, 2003

(54) ARRANGEMENT FOR TRELLIS CODING

(75) Inventors: Detlef Götting, Hamburg (DE); Mark Steigemann, UeLzen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 507 days.

(21) Appl. No.: 09/588,746

(22) Filed: Jun. 6, 2000

(30) Foreign Application Priority Data

Jun. 11, 1999 (DE) .......................................... 199 26 649

(51) Int. Cl.[7] .............................................. H03M 13/03
(52) U.S. Cl. ........................ 375/265; 714/792; 382/251
(58) Field of Search ................................ 375/265, 261, 375/341; 714/792, 794, 795; 382/251, 253

(56) References Cited

U.S. PATENT DOCUMENTS

| | | | | |
|---|---|---|---|---|
| 6,115,436 A | * | 9/2000 | Ramesh et al. | 375/341 |
| 6,272,661 B1 | * | 8/2001 | Yamaguchi | 714/795 |
| 6,324,218 B1 | * | 11/2001 | Jafarkhani et al. | 375/341 |

OTHER PUBLICATIONS

"Universal Trellis Coded Quantization" by James H. Kasner, Michael W. Marcellin and Bobby R. Hunt, Oct. 14, 1996.
"Progressive Image Coding Using Trellis Coded Quantization", by Ali Bilgin, Philips J. Sementilli, Michael W. Marcelliln, Dec. 9, 1997.
"The Viterbi Algorithm" by G.D. Forney, Proc. IEEE, vol. 61, pp. 268–278, May 1973.

* cited by examiner

*Primary Examiner*—Amanda T. Le
(74) *Attorney, Agent, or Firm*—Mike Ure

(57) ABSTRACT

A memory-efficient trellis coded quantizer divides consecutive trellis columns into groups or windows each containing the maximum number of columns for which each pair of columns in a window still retains statistical dependence with respect to the states of the column and in relation to any trellis path connecting the two columns. Back searching for code words operates on each individual window, rather than on the overall trellis. Windows are sequentially processed in pairs to derive the code words for the input that has been trellis coded. Required storage is reduced, since trellis and code word storage is required only for the windows currently being processed.

8 Claims, 3 Drawing Sheets

ARRANGEMENT FOR TRELLIS CODING

BACKGROUND OF THE INVENTION

Field of the Invention

The present invention relates to memory-efficient coding, and more particularly to memory-efficient trellis coding.

The invention relates to an arrangement for trellis coding of input values, preferably transformed pixel data of a picture, in which a trellis is formed, with an input value being assigned to each trellis column, while a predetermined number of possible states is provided in each trellis column in which the selection of a path from at least two admitted paths from one state of a trellis column n to that state in the next trellis column n+1 to which the selected path leads is dependent on the distortion between the input value assigned to the trellis column n and quantization values which are assigned to the state in the trellis column n, the distortion being a measure of the deviation between an input value and a quantization value, and in which, by means of a path-search algorithm in the reverse direction, that path through the overall trellis is searched for which the smallest cumulated distortion is found throughout the trellis.

Trellis coding is known from the publications "Universal Trellis Coded Quantization" by James H. Kasner, Michael W. Marcellin and Bobby R. Hunt, Oct. 14, 1996 and "Progressive Image Coding Using Trellis Coded Quantization" by Ali Bilgin, Philip J. Sementilli, Michael W. Marcellin, Dec. 9, 1997 and is extensively described in these publications. In accordance with these publications, a trellis is formed, i.e. a kind of lattice. In this lattice structure, an input value of the signal to be coded is assigned to each column. The trellis has as many rows as there are possible states per column in the lattice. A path is searched through the trellis, leading from the column assigned to the first input value to the last column. However, not all transitions within the trellis are admitted. Only a limited, fixed number of transitions is possible from a given admitted value in a column to the searched next admitted value in the next column. Which one of the admitted transitions is selected is made dependent on the distortion and the previously selected state which is fundamentally the difference between the input value and quantization values which in turn are assigned to the states. Thus, a path through the trellis is searched which, cumulated for all transitions in the trellis, always yields the minimal distortion from the start to the end. In this way, an end point s finally reached, i.e. a possible state in the last column of the trellis. When this point is reached, a search algorithm is used, starting from the state found for the last column, which algorithm finds a way back through the trellis, complying with the above-mentioned condition. This is possible in that, on the outward way, it is noted for each branch during the trellis coding which branch was the more favorable one. The search algorithm used for finding this path is described in both publications, in which the Viterbi algorithm is used which is known from the publication "The Viterbi Algorithm" by G. D. Forney, Proc. IEEE, Vol. 61, pp. 268 to 278, May 1973.

The trellis coding may fundamentally be understood to be a one-dimensional vector quantization. As against scalar quantization, it has the advantage that also the temporal or spatial context of the input values of a sequence is taken into account in the quantization. Furthermore, a saving in the coding of the quantization values is obtained by bringing in the previous state. However, the method described above has the drawback that all values of the trellis, thus the input values, the admitted states, the distortions determined in each transition and the selected optimal transition must be stored for the entire trellis because the path-search algorithm is not used until after the trellis coding on the outward way is performed, which path-search algorithm already falls back on the stored values. Thus, a considerable memory space is required in an arrangement for performing the trellis coding.

SUMMARY OF THE INVENTION

It is an object of the invention to provide an arrangement for performing a trellis coding of this type in which the required memory space is clearly reduced.

According to the invention, this object is solved in that means for forming windows are provided, which comprise such a quantity of trellis columns assigned to consecutive input values that trellis columns of the same position in neighboring windows are remote from each other by more than a length of influence representing that maximum distance between two trellis columns for which a statistical dependence still just exists with regard to the quantization values which are selectable in the two trellis columns in the sequence of the predetermined admitted paths through the trellis, in that storage means are provided which store the data determined and required in the windows during application of the trellis coding and/or the path-search algorithm, in that a trellis coding is performed in a first window W0 of a sequence of input values, and in that in all further windows of the sequence a trellis coding is performed in each window Wn and the path-search algorithm is applied in the window Wn and subsequently in the window Wn−1, the code words for the input values assigned to the trellis columns of the window being supplied during application of the path-search algorithm in the window Wn−1.

The basic idea of the invention is that the trellis coding including application of the path-search algorithm is not performed via an overall sequence of pixels but is performed window by window. This presents the problem that it must be ensured when performing the trellis coding and applying its path-search algorithm that no false results are obtained owing to the division into windows, in other words, the windows may not have any influence on the results of coding the overall sequence.

According to the invention, the solution to this problem is the mode of selecting the window and the mode of employing the trellis coding including the path-search algorithm, which will be described hereinafter.

There are means for forming windows which have such a number of trellis columns, to which an input value is assigned, that columns of equal position in neighboring windows are spaced apart by more than a so-called length of influence. In other words, the length of these windows is always larger than the length of influence.

The length of influence is understood to mean the distance between two columns and thus also between the input values assigned to these columns for which, due to the properties of trellis coding, there is no statistical dependence in determining the possible states in the two columns. In trellis coding, there is fundamentally a statistical dependence in determining the possible values of consecutive pixels because only a limited number of transitions is admitted from a given state of a column n to the searched state of the subsequent column n+1. This means that not any possible state can be selected in the column n+1. The further two columns are spaced apart, the more this statistical dependence is reduced. As from a given distance between two input values and thus also between two assigned columns in the trellis, this statistical dependence is quasi no longer available because the dependence for a distance towards infinity approaches zero. The distance at which this occurs can be statistically determined by way of experiment.

Based on the use of trellis coding including the application of the path-search algorithm, the arrangement according to the invention only requires storage means which store the data determined and required in the windows during use of the trellis coding and the path-search algorithm. The required memory space is considerably reduced as compared with prior-art arrangements, because a sequence of pixels can be subdivided into a multitude of windows.

The trellis coding and application of the path-search algorithm in the windows proceeds in the following way.

At the start, a trellis coding must be performed in a first window W0 of a sequence of input values.

The following procedure applies to all subsequent windows.

In a window Wn, a trellis coding is initially performed in the trellis section associated with this window. Subsequently, the path-search algorithm is applied in this window Wn. However, code words cannot yet be supplied during use of the path-search algorithm in the window Wn, because the above-described statistical independence still does not apply to the values of this window and the length of influence has not yet been exceeded. However, this applies when employing the path-search algorithm in the previous window Wn−1, because the length of influence for the same columns in the window Wn is exceeded for each column of this window Wn−1 and the statistical dependence therefore no longer applies in determining the possible states. When applying the path-search algorithm in the window Wn−1, the code words can thus be supplied. Similarly as in the prior art, the code words are supplied in dependence upon the path determined as the optimal path and the selected transitions, to which quantization values are assigned, which are supplied as code words.

Due to this selection of the window size in the trellis and the special procedure of alternately employing trellis coding on the outward way and the path-search algorithm on the way back, a considerable saving of memory space is achieved in the arrangement, because only the data of the window of the trellis must be stored.

In the alternating use of trellis coding on the outward way and the path-search algorithm on the way back, it must be ensured that the trellis coding in a window Wn starts with the same possible state which was previously determined as the last state in the same window Wn during application of the path-search algorithm. This must be ensured in order that a continuous transition occurs at the window transitions for the coding, i.e. for the values of the code words. The transitions of the window should not appear in the coding. This may be ensured that, as an admitted state, in which the trellis coding in the window Wn starts, that value is chosen which was determined by the path-search algorithm in the same window for the first column of the window.

The above-described saving of memory space may be further improved by a further embodiment of the invention as defined in claim 3. Only two memories S1 and S2 are provided which store the data of a trellis and the values determined therein.

The two memories are used in one cycle in which a trellis coding takes place in a window Wn and the path-search algorithm in the same window is applied in one memory. The path-search algorithm in the previous window is subsequently applied in the other memory. During application of the path-search algorithm in the other memory, the values are already written in the memory by the trellis values required for the subsequent trellis coding in the window Wn+1, as far as code words were supplied for given columns of the trellis. Then, the trellis coding and the path-search algorithm are performed for the window Wn+1 in the other memory. The subsequent application of the path-search algorithm in the window Wn is then again effected in the first memory, with the memory contents being already gradually replaced by the values of the next window Wn+2.

In this way, the memories are alternately used for trellis coding including the application of the path-search algorithm.

A further embodiment of the invention as defined in claim 4 uses, as path-search algorithm, the Viterbi algorithm, which can be applied in a relatively easy way.

In accordance with a further embodiment of the invention as defined in claim 5, the so-called mean-squared error is used as the above-described distortion, which error results from the square value of the difference between two values, in this case an input value and a quantization value.

In accordance with a further embodiment of the invention as defined in claim 6, the last window of a sequence is to be selected in such a way that the first and the last column of the window exceed the length of influence. This allows the use of the path-search algorithm within the last window already in the first run so that also this last window of a sequence can be coded without statistical dependence.

In accordance with a further embodiment of the invention as defined in claim 7, the input values are pixels of a still image. Before performing the trellis coding, they have been subjected to a discrete wavelet transform and the trellis coding is performed in the windows formed by this discrete wavelet transform, in which the picture data of a window represent a sequence of pixels. The statistical dependence of the pixels within this window, whose data are also denoted as sub-bands, can be very well utilized in the trellis coding.

Particularly for pixel values but also for other comparable values, for example, audio signals, a further embodiment of the invention as defined in claim 8 provides the use of the length of influence $E \geq 5.N$ in which N is the number of possible states per trellis column and thus corresponds to the number of rows in the trellis. This value is an empirical value for such signals.

These and other aspects of the invention are apparent from and will be elucidated with reference to the embodiments described hereinafter.

DETAILED DESCRIPTION OF THE INVENTION

Figure 1:
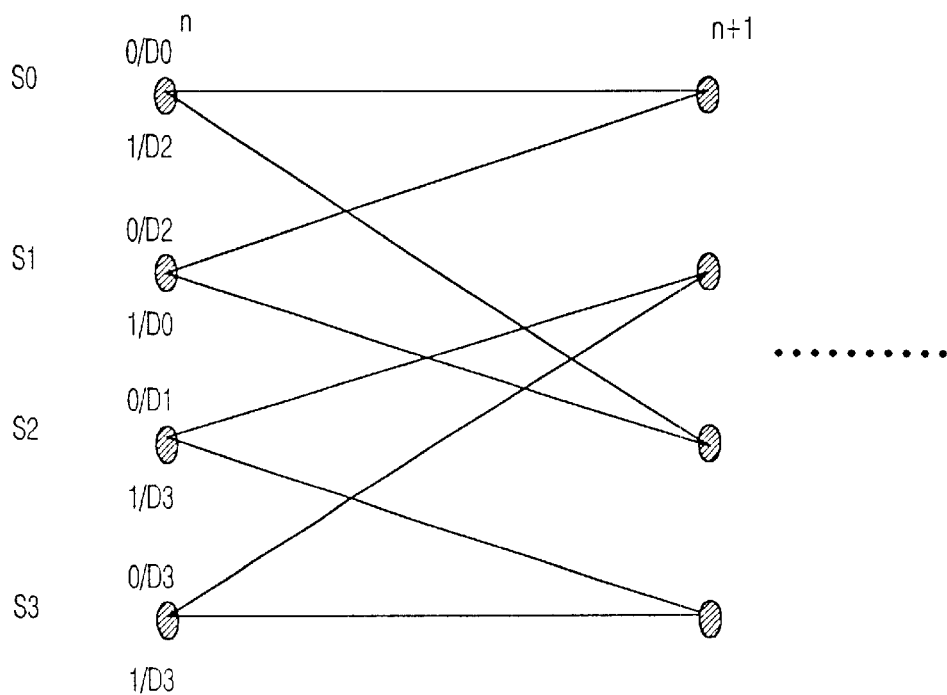
FIG. 1 shows a section of two trellis columns of a trellis in which four possible states are provided per column.

FIG. 1 is a section of a trellis which has four possible states S0, S1, S2 and S3 per trellis column. Thus, this is a trellis with four rows.

The trellis has a plurality of columns which corresponds to the number of input values to be coded because an input value is assigned to each column n, n+1 and so forth.

Assigned to every possible state in a trellis column are as many quantization values D0, D1, D2 and D3 as there are connection paths from this admitted state to other possible states of the next trellis column n+1. For example, of the possible state S0 in the trellis column n, a transition to the possible states S0 of the trellis column n+1 as well as the possible state S2 of the trellis column n+1 is provided. It is thus possible to change over to only these two possible states of the trellis column n+1 from the possible state S0 of the trellis column n. A corresponding reasoning applies to the other possible state S1, S2, S3 of the trellis column n for which there are also only two admitted paths to two possible states in the trellis column n+1. Thus, only a limited transition from one state of the trellis column n to given states of the trellis column n+1 is possible; particularly, a free selection of the possible state in the trellis column n+1 to be selected is not possible because only the admitted paths can be selected. The path structure in the trellis is predetermined and is also dependent on the number of possible states provided within a column of a trellis.

The selection of a plurality of admitted paths from one state of the trellis column n to the possible states of the trellis column n+1 is effected in accordance with the following criteria.

For example, two quantization values D0 and D2 are assigned to the possible state S0 of the trellis column n. The distortion between the input value, which is assigned to the trellis column n, and the quantization value D0 are determined. Furthermore, the value of the distortion between the input value and the quantization value D2 is determined. The quantization value D0 or D2 for which the smaller distortion was determined is selected. A transition to a state of the next column is also assigned to this quantization value. In the example shown in FIG. 1, the transition to the state S0 in the trellis column n+1 is assigned to the quantization value D0. In contrast, the transition to the possible state S2 of the trellis column n+1 is assigned to the quantization value D2.

The assigned path is selected in dependence upon the smaller distortion of one of the two quantization values. For example, if the distortion of the quantization value D0 is smaller, the first possible state S0 is selected in the trellis column n+1. If, however, the distortion of the value D2 is smaller, the possible state S2 is selected in the trellis column n+1.

The distortion is fundamentally understood to be the distance between the quantization value and the assigned input value. Particularly, the so-called mean-squared error can be employed, which represents the square value of the difference of the distance between the two values.

In trellis coding, only fixed paths can be trodden in this way from one state of a column n to states of the subsequent column n+1, which path is trodden in dependence upon the quantization values assigned to the initial state.

In the example elucidated above, it is further noted which of the two admitted paths was selected on the basis of the smaller distortion of the assigned quantization values. For example, if the distortion between the quantization value D2 and the input value of the trellis column n is smaller than the distortion between the quantization value D0 and the input value, the transition to the possible state S2 of the trellis column n+1 is selected.

In the trellis coding, it is noted at the point S0 of the trellis column n that the transition to the possible state S2 of the trellis column n+1 was selected. This information is stored and used for the purpose of finding a possibly favorable path in a subsequent application of a path-search algorithm.

At the transition from the possible state S0 of the trellis column n to the possible state S2 of the trellis column n+1 in the selected example, the distortion then determined between the quantization value D2 and the input value assigned to the trellis column n is stored in a memory to which the possible state S2 of the trellis column n+1 is assigned. This distortion is determined at every transition from one trellis column to the next and is added to the previously determined distortion. Thus, a path is tracked in the overall trellis, with the distortion being cumulated for all transitions between columns of the trellis.

In the selected example, a cumulated distortion had already been stored at the possible state S0 of the trellis column n, which distortion is now cumulated and stored together with the additionally determined distortion between the quantization value D2 and the input value of the trellis column n at the new possible state S2 of the trellis column n+1.

This procedure is repeated for all possible states of a column, while it is particularly noted for every possible state of a column n which of the admitted paths to a possible state of the column was selected. This information will be required at a later stage for the path-search algorithm.

Figure 2:
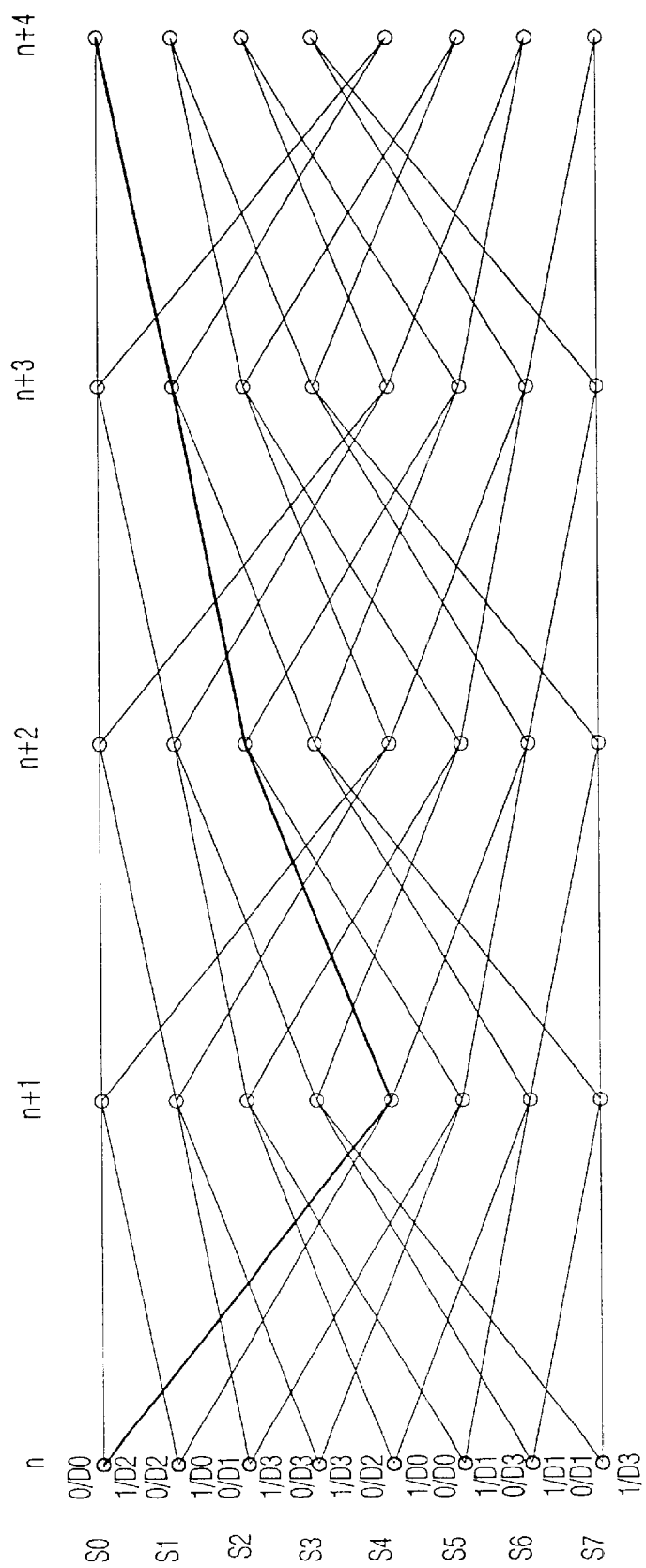
FIG. 2 shows a section of five trellis columns of a trellis with eight possible states per trellis column.

FIG. 2 also shows a section of a trellis, but one which has eight possible states per trellis column. The section in FIG. 2 is further selected to be slightly larger, showing five trellis columns n to n+4.

Also in the trellis shown in FIG. 2, only two paths from a possible state of a given trellis column are admitted so that only two possible states can be selected in the subsequent trellis column.

FIG. 2 shows a path in bold print, which is the path for which the cumulated distortion described above yields the smallest value. For example, if it is assumed that the trellis column n+4 in FIG. 2 is the last trellis column of the trellis, the admitted state S0 is determined in this trellis column shown by way of example in FIG. 2. This is the state for which the path terminating in this state yields the smallest cumulated distortion.

However, since the exact course of this path is not stored, the path-search algorithm is employed, starting from the end point found. Starting from this end value, which was selected in the last trellis column as the admitted value, a path back to the start is searched through the trellis, which path complies with the condition that it should have the smallest cumulated distortion throughout its length. In the application of the search algorithm, the information noted for each admitted state of each column of the trellis and stating which path to a state of the subsequent trellis column was found to be the more favorable one and was selected, is used for finding the optimal path.

In the example in FIG. 2 starting from the possible state S0 of the last trellis column n+4, in the trellis column n+3 the state among those possible states from which admitted paths lead to the point S0 of the trellis column n+4 was searched for which the path to the possible state S0 of the trellis column n+4 was selected and noted in the trellis coding for this state. When the Viterbi algorithm does not find such information in the trellis column n+3, a further search is made in the trellis column n+2. When such a note about the most favorable path is not found in this trellis column either, an arbitrary path is selected. Accordingly, one further proceeds in the reverse direction, i.e. towards the start of the trellis. Finally, the algorithm finds a path for which the distortions between the quantization values assigned to the possible states and to the assigned transitions and the input values assigned to the trellis columns are as small as possible.

For each trellis column and thus the assigned input value, the quantization values assigned to the possible state run through in the trellis column and the selected path are supplied as code words. When, for example, in FIG. 2, the path shown is run through on the bold-line path from the trellis column n+1 to the trellis column n, then the quantization value D2 is supplied as a code word for the input value which is assigned to the trellis column n. In a corresponding manner, code words are supplied for all trellis columns and thus for all input values of the sequence.

In the arrangements and methods in accordance with the prior art, a trellis coding including a subsequent path-search algorithm and supply of the code words is completely realized for the whole trellis. The memory space required is then considerable because all information in the trellis and all values to be stored for trellis coding, including the application of the path-search algorithm, are to be stored for all trellis columns in the memory.

According to the invention, a considerable reduction of the memory space is achieved in that the trellis coding including the application of the path-search algorithm is carried out in windows. Thus, a sequence of pixels and, accordingly, the associated trellis are split up into windows.

The selection of the window size is particularly dependent on the length of influence. The length of influence indicates the distance between two trellis columns for which, due to the fixed branching structure within the trellis, there is still just a statistical dependence in the selection of the possible states. This statistical dependence, which is due to the limited selection of the possible states, decreases with an increasing distance between the trellis columns. The length of influence now designates that distance between the trellis columns for which such a dependence still just exists. The windows are now selected as regards their size in such a way that they are just longer than this length of influence. In other words, trellis columns of the same position in consecutive windows have a distance which just exceeds the length of influence.

For picture signals and similar signals, it can be proved by means of statistical experiments that the length of influence is $E \geq 5.N$, in which N stands for the number of possible states per trellis column.

Figure 3:
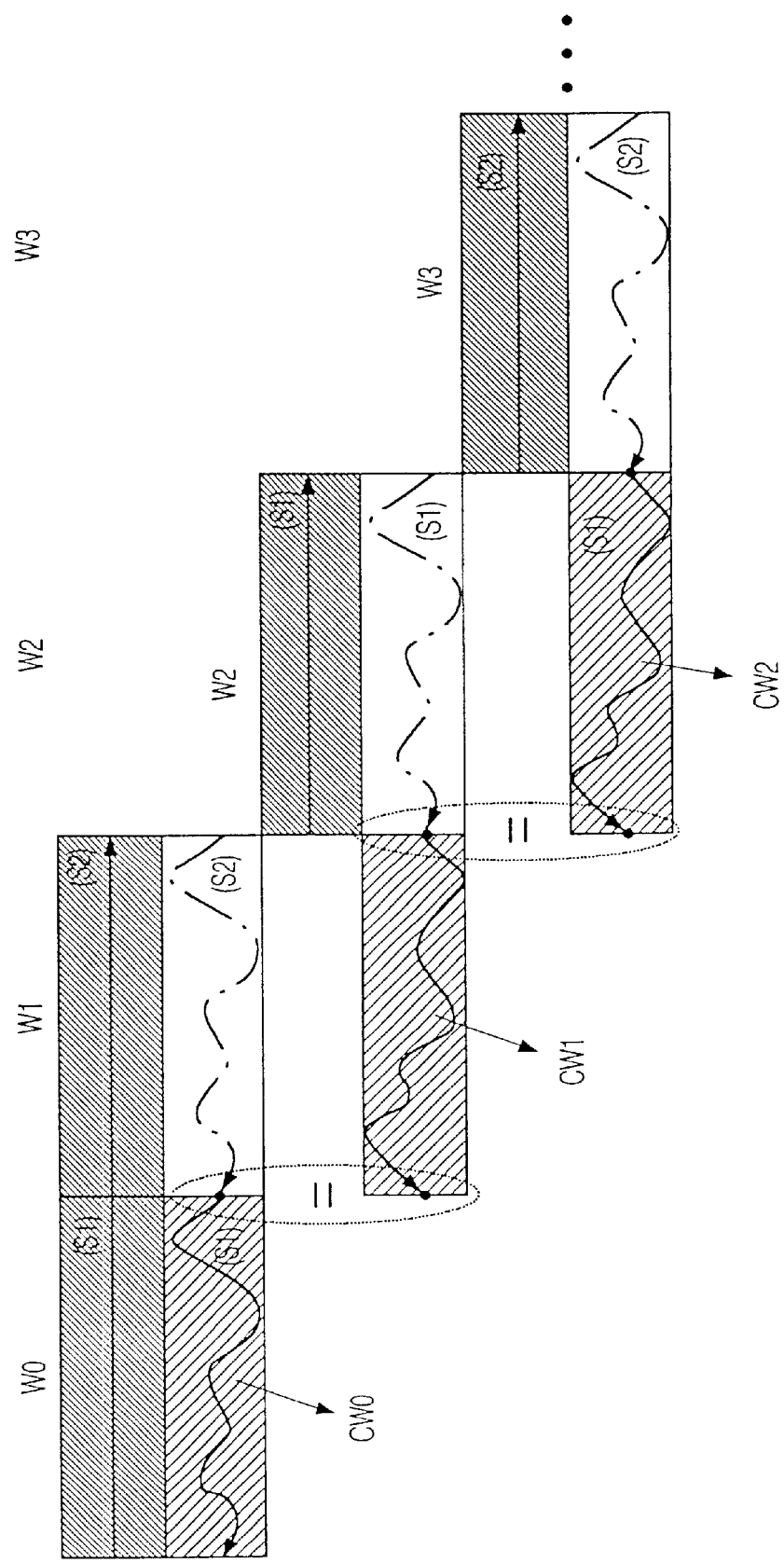
FIG. 3 shows diagrammatically the window-wise procedure of trellis quantization including the application of the path-search algorithm, while cyclically using two memories

It will now be elucidated with reference to FIG. 3, how the Viterbi coding, including the application of the path-search algorithm is performed window by window and how the storage space is managed in the arrangement according to the invention.

FIG. 3 shows diagrammatically windows W0, W1, W2 and W3. These windows constitute a part of a trellis, which is not further shown in the Figure. The windows W have a length which complies with the above-described conditions, particularly with regard to the length of influence.

The window W0 in accordance with FIG. 3 is a first window of a sequence of pixels for which first a trellis coding is performed. Subsequently, a trellis coding is also performed for the next window W1. The window W1 is subsequently run through to the start by means of the path-search algorithm, and finally a possible state is determined in the first trellis column of the window W1. Starting from this possible state, the path-search algorithm is subsequently also applied in the window W0.

When passing through the window W1 by means of the path-search algorithm, code words cannot yet be supplied because the length of influence has not yet been exceeded, i.e. from the end of the window W1 to the start of this window, the length of the influence is not yet exceeded so that there is a statistical dependence when determining the optimal path. This length of influence with reference to the end of the window W1 is not exceeded until after the path-search algorithm in the window W0 has been employed. Thus, it can be assumed that, in determining the optimal path in the window W0, there is no statistical dependence on the earlier events so that correct results are achieved. When passing through the optimal path in the window W0 by means of the path-search algorithm, code words may thus already be supplied. These code words are denoted by CW0 in FIG. 3.

The code words for the window W1 should be subsequently determined. To exceed the length of influence also in this case and thus prevent any statistical dependence, the trellis coding and subsequently the path-search algorithm are first applied for the data of the window W2. In the further application of the path-search algorithm in the window W1, the length of influence is then exceeded again so that code words can be supplied again, this time the code word CW1 for the window W1.

In a corresponding manner, the procedure is carried out for the further windows. For the supply of the code words CW2 of the window W2, the Viterbi algorithm as well as the path-search algorithm must first be employed in the subsequent window W3. Only thereafter can the code words CW2 be supplied when passing through the window W2 by means of the path-search algorithm, because only then the length of influence is exceeded.

In spite of the division of the trellis into the windows, it is thus achieved that a trellis coding can take place without the windows having any influence on the coding. This is achieved in that the windows are chosen to be larger than the length of influence, i.e. the statistical dependence during trellis coding.

To exclude also statistical coincidences, it can be advantageously ensured that the possible state of the first trellis column of this window, which is reached upon supply of the code words when passing through this window by means of the path-search algorithm, is the same possible state as the one which was determined previously in the same window when the path-search algorithm in the first column was run through for the first time. This is necessary because this point for the application of the path-search algorithm serves as the starting point in the supply of code words in the window Wn−1 and because no jump of the possible states at this point of transition may occur when the code words are supplied.

With reference to FIG. 3, this has the following significance.

When performing the trellis coding in the window W1 and subsequent application of the path-search algorithm, a possible state is selected in the first trellis column of the window W1 which subsequently serves as a starting point in the application of the path-search algorithm in the window W0 and in the supply of the code words CW0. Subsequently, a trellis coding and a subsequent application of the path-search algorithm are effected in the window W2, followed by a supply of the code words CW1 in the window W1 while employing the path-search algorithm. In this window, an end point is finally reached, i.e. a possible state in the first trellis column which was selected. This point must be identical to the point that was selected as the starting point in the window W0 when the path-search algorithm was employed. This is designated in the Figure by means of an equality sign. This identity of the two points should normally be given.

Due to statistical coincidences, this might not always be the case. In such a case, the path through the trellis is generated in such a way that, for the two adjoining windows, the last and the first selected state correspond to each other. To get from one given point of a trellis to another, arbitrary point, a fixed, minimal number of steps, fixed by the construction of the trellis, is required. In an example with 8 selectable states per trellis column, the last three states in a window Wn are then to be replaced so as to guarantee a continuous path in the window Wn-1. Since the trellis construction is equal for all transitions, a table comprising all transition combinations may be used so as to repair the path through the trellis in a simple way.

With the arrangement according to the invention, the required memory space for performing the trellis coding, including the application of the path-search algorithm is very small because only the data required for the relevant trellis window must be stored. This memory space may even be further reduced by means of a special, advantageous memory organization. Then, only two memories S1 and S2 are required, which can be cyclically used in the trellis coding and path-search algorithm operations.

In FIG. 3, parentheses indicate which memory S1 or S2 is used for the relevant window. Apart from the first trellis coding operation in the window W0, these memories are used cyclically. For example, in the window W1, the trellis coding and subsequent path-search algorithm are performed in the memory S2. The subsequent application of the path-search algorithm in the window W0 is effected in the memory S1. However, since the code words are already supplied in the window W0 so that the trellis information is no longer subsequently needed, the information of the window W2 is already stored in those trellis columns for which code words were already supplied. Thus, during supply of the code words, the old information of the trellis window W0 is quasi replaced by the information of the trellis window W2. As a result, the trellis coding can already be performed subsequently in the window W2 in the same memory after application of the path-search algorithm in the window W0. The path-search algorithm is employed in the window W2 also in this memory. The subsequent application of the path-search algorithm in the window W1, in which code words are already supplied again, is then effected in the memory S2 which is free in the meantime. Here again, the information in the memory S2 is already replaced column by column by information of the next window W3 during the supply of the code words, so that the described process can be repeated in this window.

In this way, the two memories S1 and S2 are used cyclically and utilized to an optimal extent. As compared with the arrangements of the prior art, there is a clear reduction of the required memory space.

Figure 4:
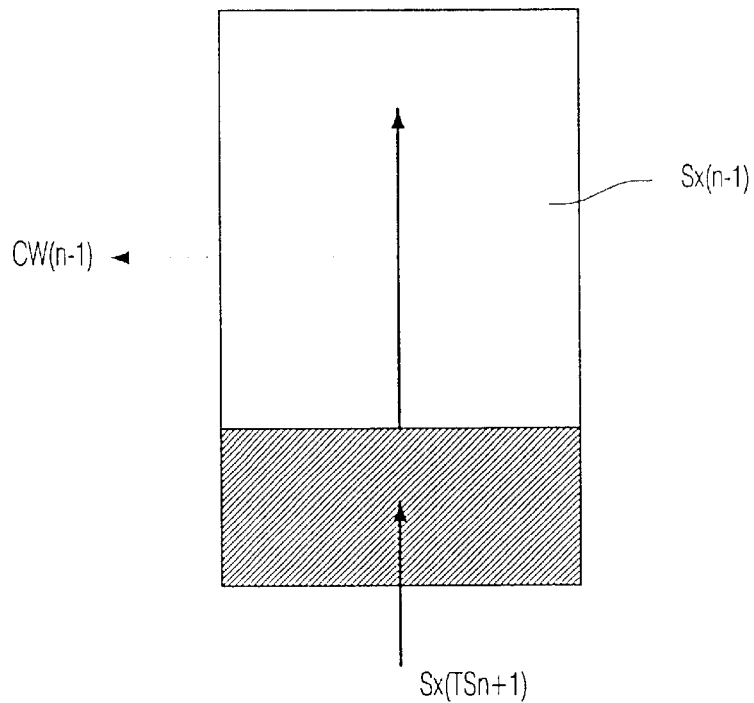
FIG. 4 shows diagrammatically one of the memories for elucidating the data organization.

FIG. 4 shows diagrammatically a process in which the data Sx of a trellis window n-1 are initially stored in one of the memories S1 or S2. For these data, there is a supply of code words CW(n-1) when the path-search algorithm is being employed.

A shaded block in the Figure indicates that the code words CW(n-1) have already been supplied by means of the path-search algorithm from the data Sx(n-1) of the trellis window n-1. This memory space may already be filled with new data Sx(n+1) of a trellis window n+1.

Upon continuing application of the path-search algorithm for the data Sx of the window n-1, the range of these data in the memory will become increasingly smaller and the shaded range, in which already data of the trellis window Sx(n+1) are stored, will become larger. This occurs until all code words of the window n-1 have been supplied and the total memory has been filled with the data Sx of the window n+1. Thus, a trellis coding can be subsequently performed for these data in this memory.

What is claimed is:

1. A trellis coded quantizer for trellis coding of input values to determine respective code words, the quantizer operating on a trellis having at least n+1 trellis columns ($n \geq 1$) to each of which a predetermined number of possible states are assigned, an input value to the column i ($i \leq n$) being assigned to a state of column i and being afforded selection between at least two predetermined admitted paths to respective states of the column i+1, the selection delivering a corresponding input value for assignment to the selected respective state of the respective column and being based on respective deviations between the input value of the column i and respective quantization values of the at least two admitted paths, so that a sequence of paths in a forward direction can be defined by a series of selections, a deviation associated with a current path selection being accumulated selection-by-selection, the quantizer being configured for performing, by means of a path-search algorithm, a search on the trellis in a reverse direction for a reverse sequence of said paths that minimizes accumulated deviation, the quantizer comprising:

means for dividing the columns by allocating, to respective windows, the largest number of consecutive ones of the columns so that at least a predetermined level of statistical dependence still exists between any two columns of the window with regard to their respective possible states in relation to said sequence of paths in the forward direction extending from one of said two columns to the other of said two columns; means for storing data determined and data required during processing of a current one of said windows during application of at least one of the trellis coding and the path-search algorithm; and code word determining means, for performing trellis coding in a first window $W_0$ of a sequence of input values defined by said delivering to respective columns allocated to windows, and for further performing for all windows $W_k$ ($k \geq 1$) of said sequence of input values a trellis coding, followed by said search in the window $W_k$ and subsequently in the window $W_{k-1}$, code words for the input values assigned to trellis column states defined by said reverse sequence being supplied to said means for storing during application of said search to the window $W_{k-1}$.

2. The quantizer of claim 1, further configured for ensuring that the state of the first column, from the standpoint of the forward direction, defined by said search in the window $W_k$ matches the state of the first column, from the standpoint of the forward direction, defined by a subsequent search in the window $W_k$ in determining said code words of said sequence of input values.

3. The quantizer in claim 1, wherein said performing for all windows $W_k$($k \geq 1$) is executed for, and in the order of, consecutive integral values of k as an index, and wherein said means for storing includes a first memory (S1) and a second memory (S2) for said storing data determined and data required so that one of S1 and S2 services even-indexed windows of said sequence of input values and the other of S1 and S2 services odd-indexed windows of said sequence of input values.

4. The quantizer of claim 1, wherein said path-search algorithm comprises the Viterbi algorithm.

5. The quantizer of claim 1, wherein said selection being based on respective deviations is based on corresponding squared distances between said input value of the column i state and said respective quantization values.

6. The quantizer of claim 1, wherein, from the standpoint of the forward direction, the last window of said sequence of input values has a plurality of columns which is larger than said largest number.

7. The quantizer of claim 1, wherein the input values are pixels of a still image subjected to a two-dimensional discrete wavelet transform.

8. The quantizer of claim 1, wherein said predetermined number of possible states is N which is the same for each of the columns, and said largest number is $E \geq 5 \cdot N$.

* * * * *